United States Patent [19]

Endō

[11] 4,110,754
[45] Aug. 29, 1978

[54] DETECTION OF ANGULAR DISPLACEMENT TO AN OBJECT FROM THE MOVING VEHICLE

[75] Inventor: Hiroshi Endō, Yokosuka, Japan

[73] Assignee: Nissan Motor Company, Limited, Yokohama, Japan

[21] Appl. No.: 801,315

[22] Filed: May 27, 1977

[30] Foreign Application Priority Data

May 29, 1976 [JP] Japan .................................. 51-61787

[51] Int. Cl.$^2$ ............................ G01S 9/02; G01S 9/44
[52] U.S. Cl. ............................. 343/16 R; 343/7 UM; 343/9; 343/17.2 R
[58] Field of Search ...................... 343/9, 17.2 R, 17.5, 343/16 R, 7 UM

[56] References Cited

U.S. PATENT DOCUMENTS

| 3,438,033 | 4/1969 | Preston | 343/16 R |
| 3,889,261 | 6/1975 | Sirven | 343/17.5 |

Primary Examiner—S. C. Buczinski
Attorney, Agent, or Firm—Bacon & Thomas

[57] ABSTRACT

A pair of first and second antennas is mounted at the front end of a roadway vehicle. A first sequence of recurring bursts of energy at two different frequencies is transmitted from the first antenna and a second sequence of similar bursts of energy is transmitted from the second antenna at alternate intervals with the bursts of energy transmitted from the first antenna. The signals transmitted from the first and second antennas are reflected from an object and received respectively by the first and second antennas and sampled at appropriate intervals to derive a first set of two Doppler signals from the signal received by the first antenna and a second set of two Doppler signals from the second antenna. The relative phase between the Doppler signals derived from the first antenna and the relative phase between those derived from the second antenna are detected by first and second phase detectors, respectively. The outputs from the phase detectors are subtracted from each other to utilize the difference therebetween as an input data to a microcomputer to determine the angular displacement of the object from the center axis of the vehicle.

14 Claims, 11 Drawing Figures

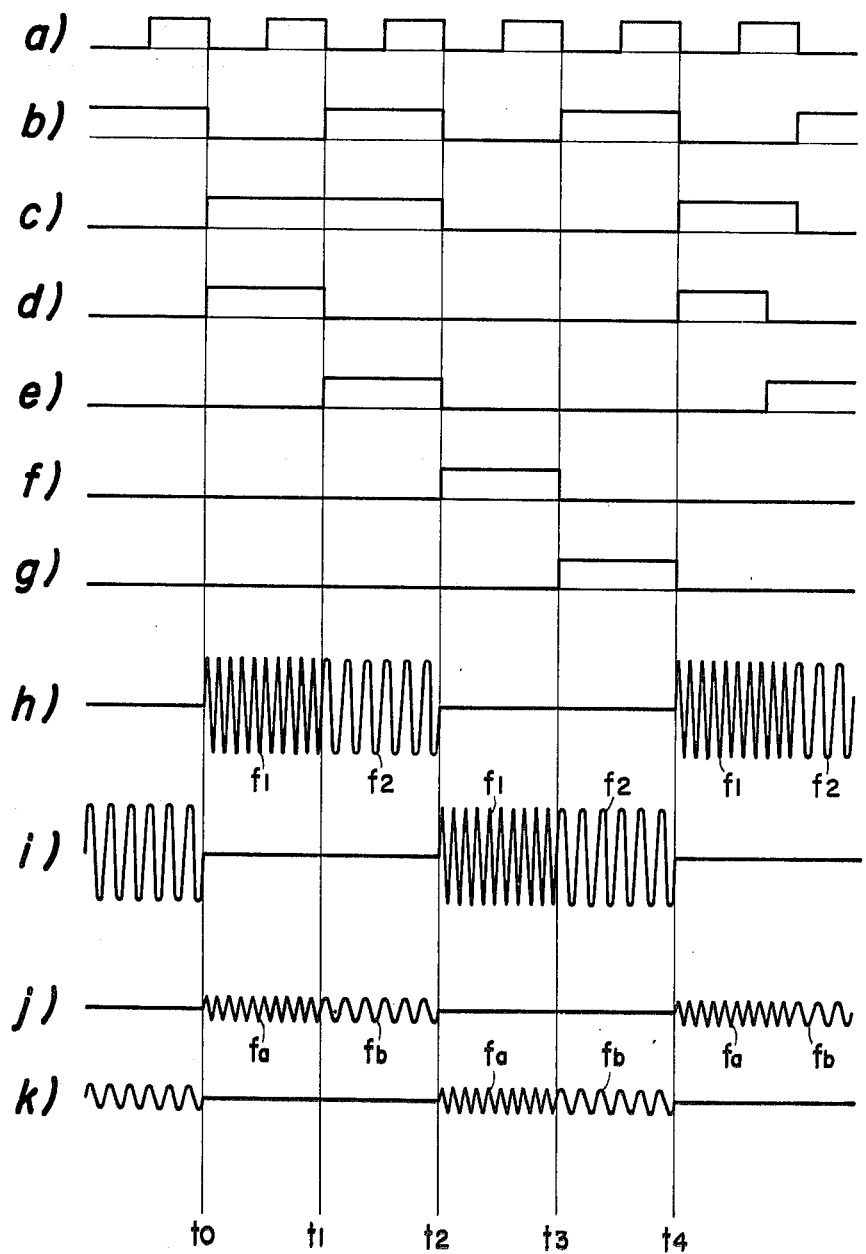

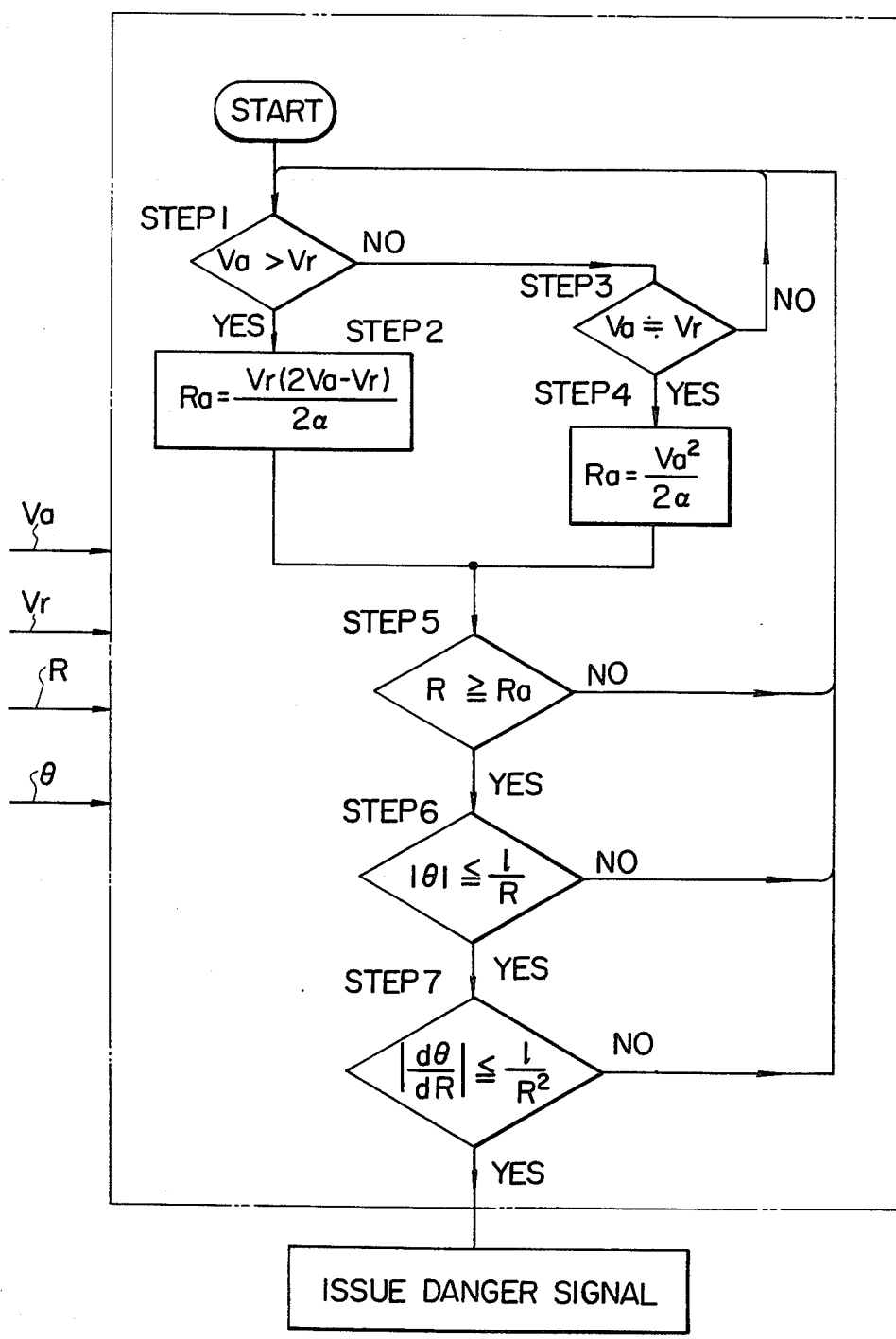

DETECTION OF ANGULAR DISPLACEMENT TO AN OBJECT FROM THE MOVING VEHICLE

FIELD OF THE INVENTION

The present invention is concerned generally with radar-operated vehicle safety systems, and more specifically it relates to apparatus for detecting the angular displacement of an object ahead relative to the center axis of the vehicle in order to provide a valid signal for the prevention of collision.

BACKGROUND OF THE INVENTION

Radar-operated vehicle safety systems provide a collision warning signal when the vehicle is in danger of collision by comparing the detected range to the object with an estimated vehicle's stopping distance. Because of the space limitations, the size of an antenna mounted on the vehicle is desired to be as small as possible, which contradicts with the desire to obtain a narrow beam width since such a narrow beam is only possible with the use of a parabolic antenna too large for mounting on the vehicle. The resultant radar beam would thus disperse to such a degree that echo signals from fixed targets along the roadway or from oncoming vehicles on different lanes produce invalid warning signals.

It has been proposed to utilize the fact that the angular displacement of a target increases inversely with the distance thereto. A range of angular displacements is determined as a function of the distance to the target and used to discard the signals that return from targets outside of the predetermined range.

Japanese Patent Application No. Sho 51-21803 discloses a radar-operated safety system which senses a number of input variables and if the following conditions are simultaneously met, the system recognizes that the vehicle is in danger or collision and issues a warning signal that is used to alert the driver or operate brakes:

$$|\theta| \leq \frac{l}{R}$$

$$\left|\frac{d\theta}{dR}\right| \leq \frac{l}{R^2}$$

$$R \geq Ra$$

where,
 $\theta$ = angular displacement of the object from the center axis of the vehicle;
 $l$ = distance between the object and the center axis of the vehicle;
 $R$ = detected distance to the object;
 $Ra$ = stopping distance of the vehicle;
where the stopping distance Ra is given by
 $Ra = Va^2/2\alpha$, wherein $Va \div Vr$ (i.e. the object is stationary), or
 $= Vr(2Va - Vr)/2\alpha$, when Va is greater than Vr, where Va is the vehicle speed, $\alpha$, the amount of deceleration, and Vr, the vehicle speed relative to the object.

SUMMARY OF THE INVENTION

The primary object of the invention is to determine the angular displacement or azimuth angle of the object from the center axis of the vehicle by transmitting a sequence of recurring bursts of energy at two different frequencies at alternate intervals from two antennas mounted at the front end of the vehicle equally spaced from the center axis. The transmitted signals are reflected from an object and received by the respective antennas from which the signals are transmitted. By using a sampling technique, a first pair of Doppler signals is derived from the first antenna and a second pair of Doppler signals from the second antenna. The Doppler signals of the first pair are applied to a first phase detector to detect the relative phase of the two Doppler signals. Likewise, the relative phase of the Doppler signals of the second pair is detected by a second phase detector. The outputs from the first and second phase detectors are subtracted from each other and is used to determine the final result.

The recent advances in semiconductor technology have made possible the use of computer technology within small packaged units at reasonable costs.

another object of the invention is to utilize the recent advances in the large-scale integration technique by feeding various necessary data in digital format to a microcomputer. For this purpose, the phase detectors are designed to produce a digital count output representing each phase difference, which output is fed into the microcomputer for subsequent derivation of an accurate angular displacement.

BRIEF DESCRIPTION OF THE DRAWINGS

These and other objects, features and advantages of the invention will be understood from the following description taken in conjunction with the accompanying drawings, in which:

FIGS. 5 and 6 are waveform diagrams useful for describing the embodiment of FIG. 4;

FIG. 8 is a flow chart showing the process of determining when the vehicle is in danger of collision;

DESCRIPTION OF THE PREFERRED EMBODIMENTS

Figure 1:
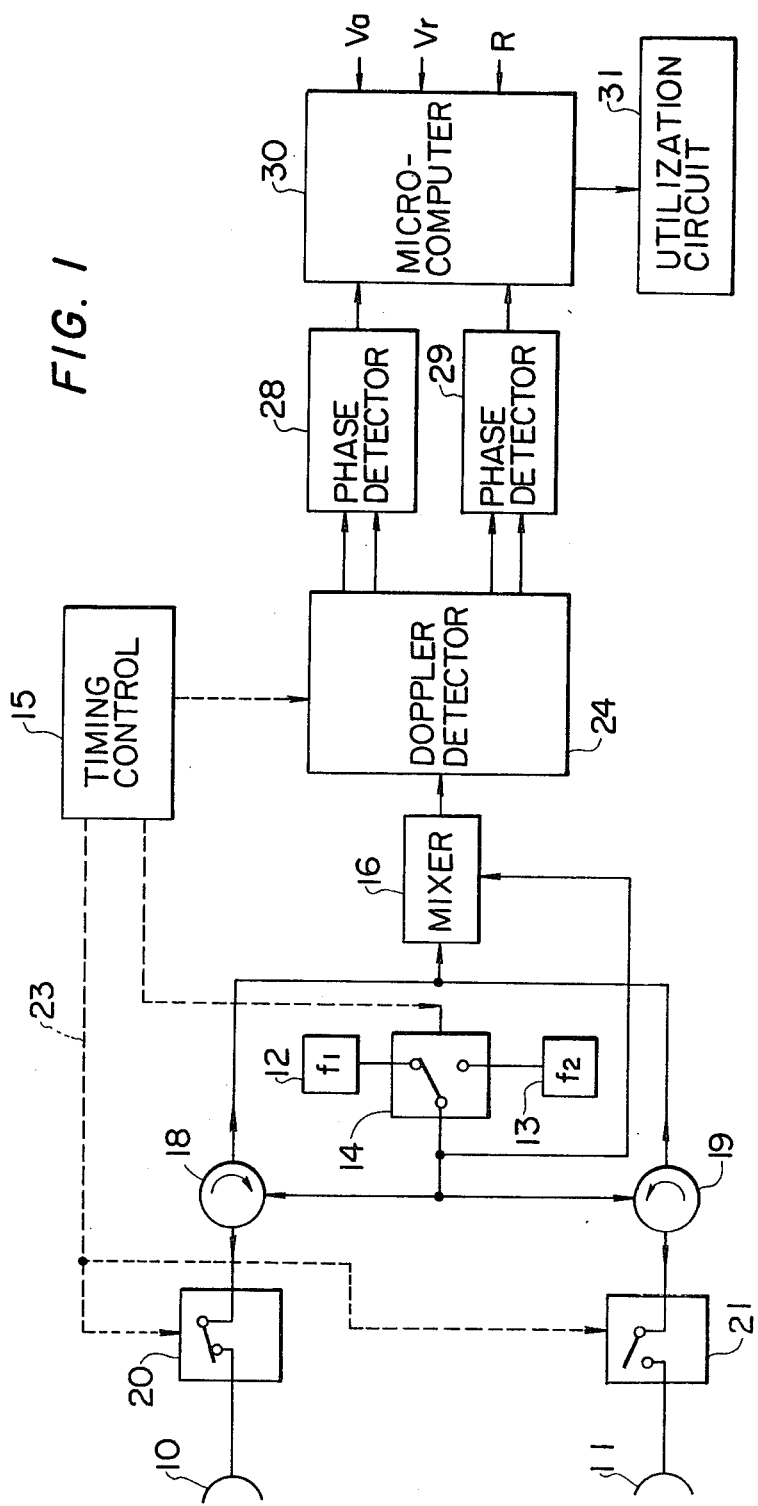
FIG. 1 is a schematic illustration of the invention.

Referring now to FIG. 1, the radar warning device of the invention is schematically illustrated as comprising generally two parabolic antennas 10 and 11 mounted on the front end of a roadway vehicle with a predetermined spacing "2l" therebetween. High-frequency signals in the microwave region at frequency $f_1$ and $f_2$ are supplied alternately from sources 12 and 13 through an electronic switch 14 under the control of a signal from a timing control unit 15. The switched high frequency signals are coupled to a mixer 16 as a local oscillator signal and also to circulators 18 and 19 and thence to the antennas 10 and 11 via electronic switches 20 and 21, respectively. The electronic switches 20 and 21 are in turn under the control of signals from the timing control unit 15.

Figure 2:
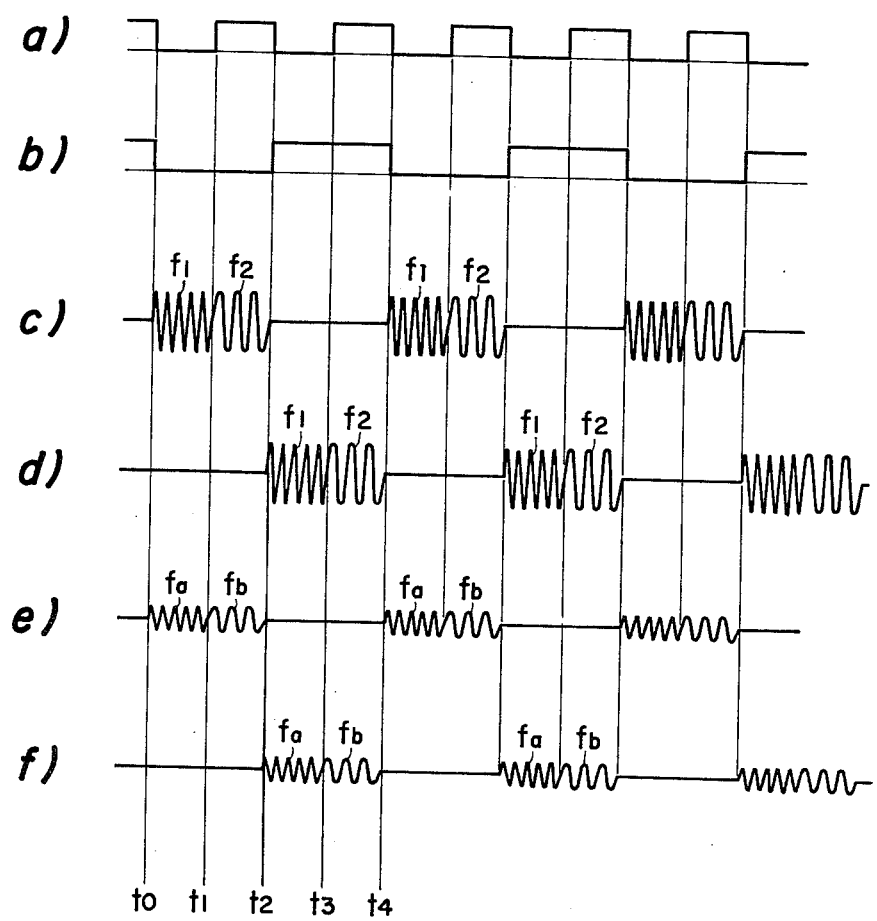
FIG. 2 is a waveform diagram useful for describing the operation of the illustration of FIG. 1.

The electronic switch 14 is controlled by a train of periodic pulses shown in FIG. 2a supplied on lead 22 from the control unit 15 so that during the time interval $t_0$ to $t_1$ the signal at frequency $f_1$ is coupled through the switch 14 to the circulators 18 and 19 and during the time interval $t_1$ to $t_2$ the signal at frequency $f_2$ is then coupled to the circulators. Typically, the control pulses on lead 22 each have a duration of 1 miscrosecond with the same interval between successive pulses.

Electronic switch 20 normally remains closed while electronic switch 21 normally opens and these switches are controlled by a train of square wave pulses supplied on lead 23 from the timing control unit. The pulses on lead 23 have a duration twice that of the pulses on lead 22 as seen in FIG. 2b, so that during the time interval $t_0$ to $t_2$ the switch 20 remains closed to allow the signal from the switch 14 to be fed to the antenna 10. During the time interval $t_2$ to $t_4$, switch 21 is closed to pass the signal from the switch 14 to the antenna 11. Therefore, it will be understood signals at frequencies $f_1$ and $f_2$ are transmitted consecutively in the form of a burst signal with a duration of a microseconds alternately from the antennas 10 and 11, in a manner as illustrated in FIGS. 2c and 2d.

The transmitted signals undergo Doppler frequency shift as they return from an object in front and received by the antenna from which the signals are transmitted. The signals $f_1$ and $f_2$ transmitted during time interval $t_0$ to $t_1$ from the antenna 10 undergo frequency shift so that the return signals will be received in the form of a burst signal at frequencies $fa$ and $fb$ in succession during the same interval as illustrated in FIG. 2e, where $fa = f_1 \pm f_{d1}$, and $fb = f_2 \pm f_{d2}$ where $f_{d1}$ and $f_{d2}$ are Doppler frequencies of the respecitve return signals. Likewise, the signals $f_1$ and $f_2$ transmitted from the antenna 11 during the time interval $t_2$ to $t_4$ will be received in the form as illustrated in FIG. 2f.

The return signals are passed through the respective circulators to the mixer 16 where they are mixed with the local oscillator signal from the output of switch 14. The mixer output is then fed into a Doppler detector 24 which separates the mixer output into different Doppler signals.

Figure 3:
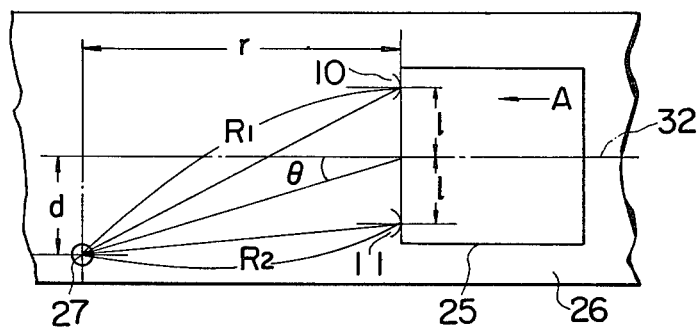
FIG. 3 shows the location of an object with respect to the vehicle travelling on a lane at a given instant of time and the designations of the dimensions used for calculation of the desired result.
Figure 7:
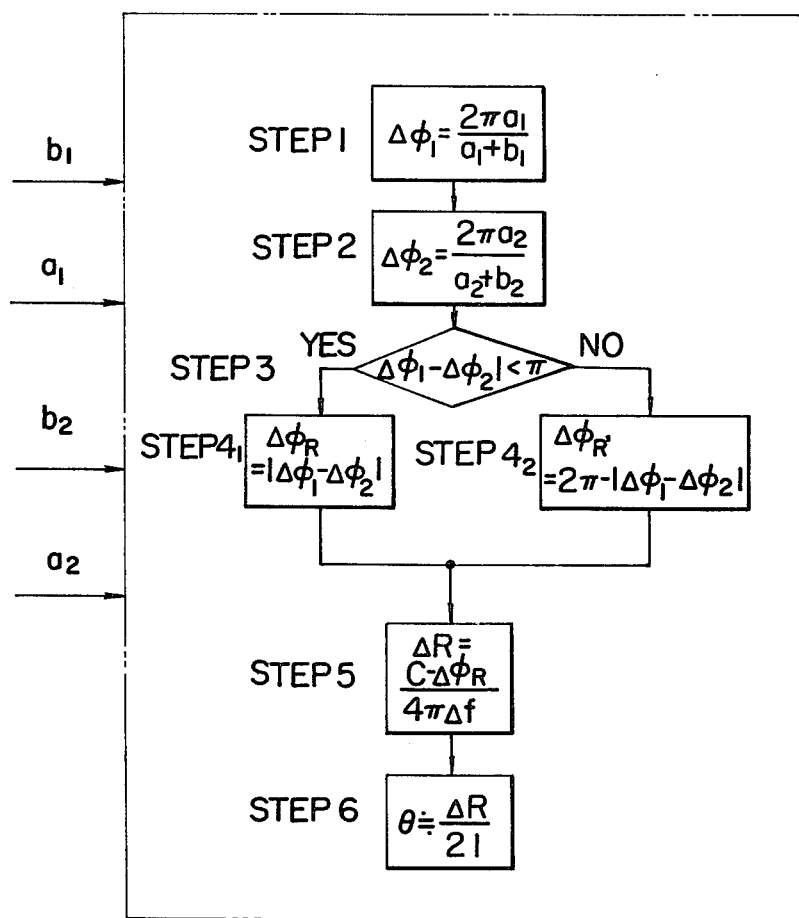
FIG. 7 is a flow chart necessary for computing the outputs from phase detectors to obtain the azimuth angle.

As illustrated in FIG. 3 it is assumed that the vehicle 25 equipped with the radar system of the invention is travelling in the direction as indicated by the arrow A along a lane 26 at a given instant at a speed Va with a distance $r$ to the object 27 which is displaced a distance $d$ from the center line 32 of the vehicle. The distances between the object 27 and antennas 10 and 11 are denoted by $R_1$ and $R_2$, respectively, and the azimuth angle of the object relative to the center line 32 is given by $\theta$ (radian). The following equation will hold:

$$\Delta R = \frac{2ld}{r} \quad (1)$$

where, $\Delta R$ is the difference between distances $R_1$ and $R_2$. The azimuth angle is given by the following equation:

$$\theta \approx \tan \theta = \frac{d}{r} \quad (2)$$

Therefore, $$\theta \approx \frac{R}{2l} \quad (3)$$

From the teaching of the book entitled "Introduction to Radar Systems" by M. I. Skolnik published by Mcgraw-Hill Book Company, Inc., pages 114–115, the Doppler component from the mixer 24 associated with the signal $f_1$ from the antenna 10 is given by $$D_{11} = A_1 \sin(2\pi f_{d1} t - \frac{4\pi f_1 R_1}{c}) \quad (4)$$

and the Doppler component associated with the signal $f_2$ from the same antenna is also given by $$D_{12} = A_2 \sin(2\pi f_{d2} t - \frac{4\pi f_2 R_1}{c}) \quad (5)$$

where, $c$ is the velocity of propagation. Similarly, the Doppler components of the mixer output associated with the signals $f_1$ and $f_2$ transmitted from the antenna 11 are given respectively by the following equations:

$$D_{21} = B_1 \sin(2\pi f_{d1} t - \frac{4\pi f_1 R_2}{c}) \quad (6)$$

$$D_{22} = B_2 \sin(2\pi f_{d2} t - \frac{4\pi f_2 R_2}{c}) \quad (7)$$

These Doppler components $D_{11}$ to $D_{12}$ are separated from each other in the detector circuit 24 and fed into phase detectors 28 and 29. The phase detector 28 provides detection of phase difference between the Doppler signals $D_{11}$ and $D_{12}$. Likewise, phase detector 29 provides an output representing the difference in phase between signals $D_{11}$ and $D_{12}$. Therefore, the outputs from the phase detectors 28 and 29 are given respectively by the following equations:

$$\Delta\phi_1 = \frac{4\pi}{c} R_1 (f_1 - f_2) \quad (8)$$

$$\Delta\phi_2 = \frac{4\pi}{c} R_2 (f_1 - f_2) \quad (9)$$

which give $$R_1 = \frac{c}{4\pi (f_1 - f_2)} \Delta\phi_1 \quad (10)$$

$$R_2 = \frac{c}{4\pi (f_1 - f_2)} \Delta\phi_2 \quad (11)$$

Then, the difference $\Delta R$ between $R_1$ and $R_2$ is $$\Delta R = \frac{c}{4\pi (f_1 - f_2)} |\Delta\phi_1 - \Delta\phi_2| \quad (12)$$

when $|\Delta\phi_1 - \Delta\phi_2|$ is smaller than $\pi$ radian, and $$\Delta R = \frac{c}{4\pi (f_1 - f_2)} (2\pi - |\Delta\phi_1 - \Delta\phi_2|) \quad (13)$$

when $|\Delta\phi_1 - \Delta\phi_2|$ is equal to or greater than $\pi$ radian. From Equations (3), (12) and (13), the azimuth angle is given as follows:

$$\theta = \frac{c}{8\pi l (f_1 - f_2)} |\Delta\phi_1 - \Delta\phi_2| \quad (14)$$

or $$\theta = \frac{c}{8\pi l (f_1 - f_2)} (2\pi - |\Delta\phi_1 - \Delta\phi_2|) \qquad (15)$$

The outputs from the phase detectors 28 and 29 are fed into a microcomputer 30 which is programmed to process the input signals representing the phase differences $\Delta\phi_1$ and $\Delta\phi_2$ to derive the azimuth angle $\Lambda$. To the mirocomputer 30 are also fed a number of data concerning the vehicle speed Va, the speed Vr relative to an object and the distance or range R to the object. These data will be processed with the azimuth angle to determine when the vehicle is in danger of collision and provide an output to a utilization circuit 31 which alerts the vehicle driver or actuates brakes.

Figure 4A:
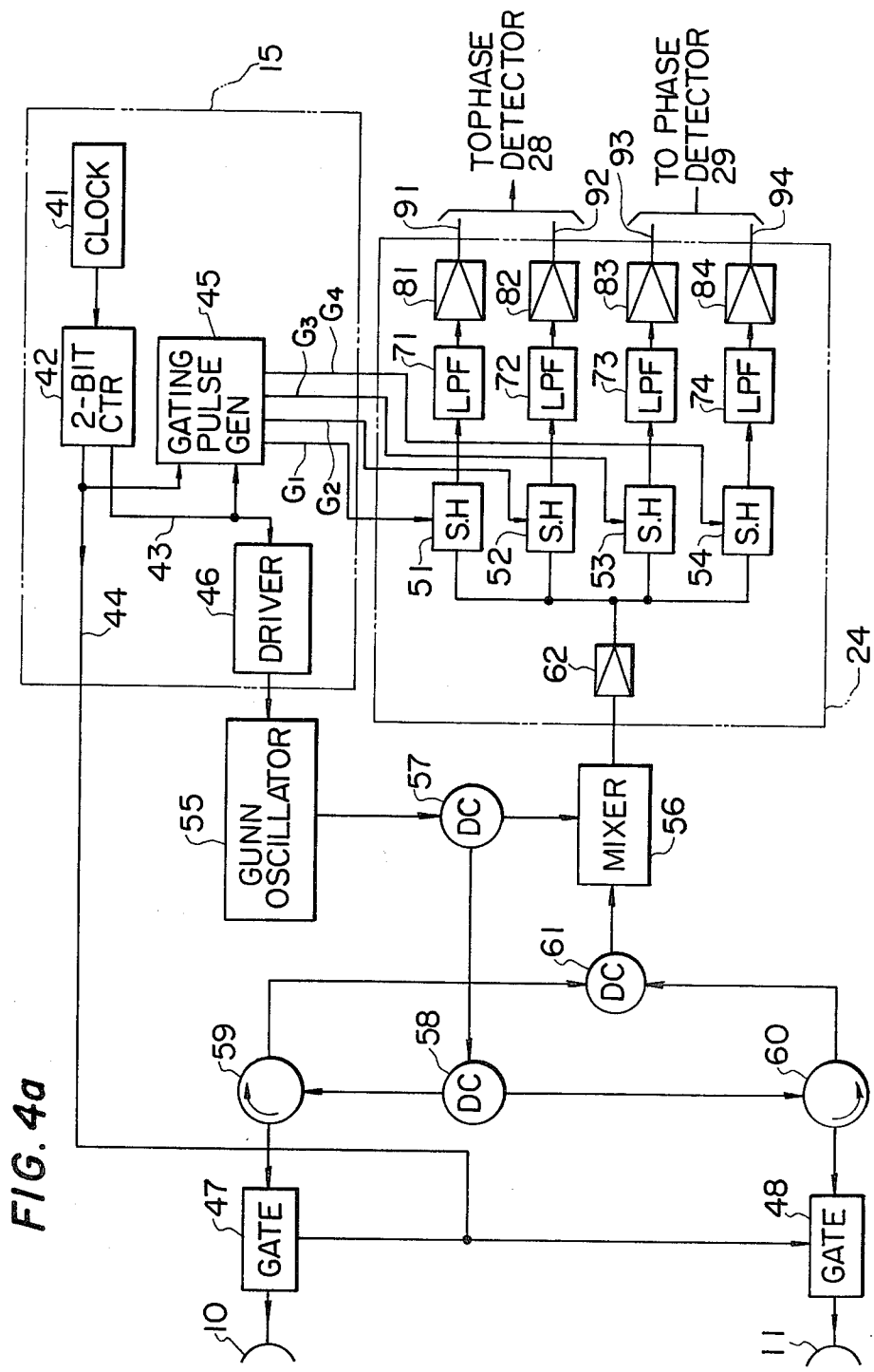
FIGS. 4a and 4b is a first preferred embodiment of the invention.
Figure 4B:
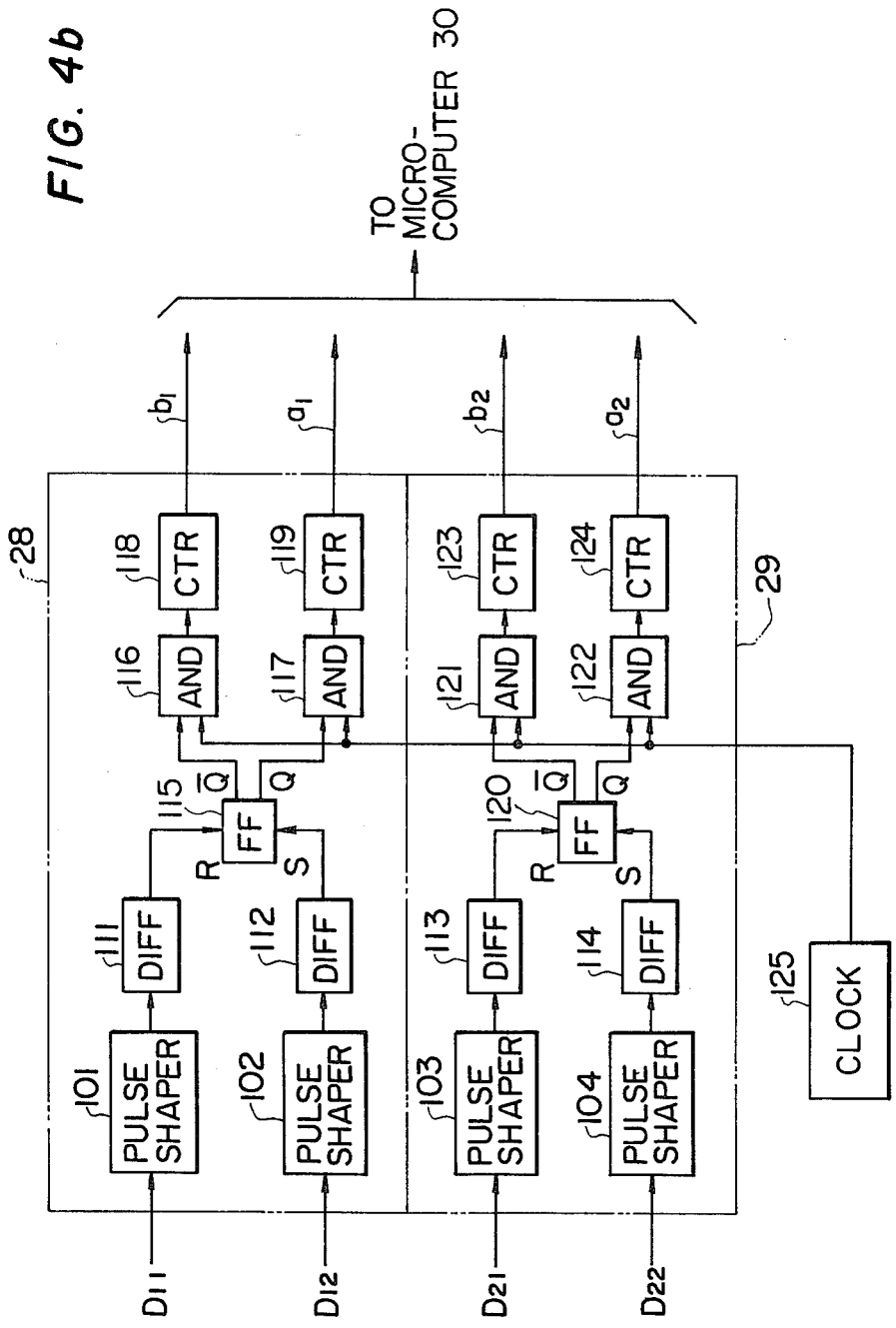

FIGS. 4a and 4b illustrate a first preferred embodiment of the invention. In FIG. 4a, the timing control unit 15 includes a crystal quartz oscillator or clock generator 41 which generates a train of pulses at a repetition frequency of 1 MHz (with a duration of 0.5 microseconds, see FIG. 5a). The output from the clock generator 41 is fed into a 2-bit binary counter 42 which provides a train of pulses with a duration of 1 microsecond (FIG. 5b) on lead 43 to an input of a sampling pulse generator 45 and to a pulse driver 46, and a train of pulses with a duration of 2 microseconds (FIG. 5c) to the other input of the sampling pulse generator 45 and on lead 44 to the inverted control terminal of transmission gate 47 and the noninverted control terminal of gate 48. The sampling pulse generator 45 synthesizes sampling pulses and distributes them to output leads G1, G2, G3 and G4 which are connected to the sampling gates of sample-and-hold circuits 51, 52, 53 and 54 of the Doppler detector 24. These sampling pulses each have a duration of 1 microsecond and appear on the output leads in sequence one after another (see FIGS. 5d, 5e, 5f and 5g).

The output of the driver 46 is connected to a Gunn oscillator 55, which generates in response to the signal level of the input pulses so that during a given interval a 1 microsecond the ouput of the Gunn oscillator is at a frequency $f_1$ and during the subsequent interval the output frequency is changed to $f_2$. Therefore, the Gunn oscillator is shifted in frequency to $f_1$ and $f_2$ for an interval of 1 microsecond each, while the transmission gates 47 and 48 alternately open their gates for transmission for an interval of 2 microseconds. The output from the Gunn oscillator 55 is coupled through a directional coupler 57 to a mixer 56 and to another directional coupler 58 and thence to circulators 59 and 60. This results in the transmission of a recurrent series of two-microsecond frequency-shifted bursts from the antenna 10 alternately with a recurrent series of similar bursts from antenna 11 (FIGS. 5h and 5i). Each burst represents two successive energies of equal duration at frequencies $f_1$ and $f_2$.

While each transmission gate is enabled, the return signal is passed through the respective path provided by circulators 59 and 60 to a directional coupler 61 and thence to the mixer 56. The mixer is thus fed with a train of bursts of 2 microseconds at frequencies $fa$ and $fb$ of 1 microsecond interval each through antenna 10, gate 47 and circulator 59 and a similar train of such bursts through antenna 11, gate 48 and circulator 60 at alternate intervals with the bursts received by antenna 10 (FIGS. 5j and 5k).

The mixer output is a series of Doppler signals each of a 1 microsecond duration which is amplified by a preamplifier 62 and applied to the sample-and-hold circuits 51 to 54. Since the sampling pulses are synchronized with the fequency shift timing of the Gunn oscillator 55, the mixer output is separated by the sample-and-hold circuits 51 to 54 into four Doppler signals each associated with a different transmission frequency and go-and-return path. The sampled signals are held substantially at the same level until the next sampling occurs so that the output from each sample-and-hold is an incremental voltage waveform which is smoothed out into sinusoidal waveform by a respective one of lowpass filters 71, 72, 73 and 74 applied to a respective one of automatic gain controlled amplifiers 81, 82, 83 and 84. Therefore, the output at terminal 91 from amplifier 81 is a Doppler signal $D_{11}$ which results from the transmission of signal $f_1$ from antenna 10 during the time interval $t_o$ to $t_1$ and so on and the output at terminal 92 is a signal $D_{12}$ resulting from the transmission of signal $f_2$ from the same antenna during the time interval $t_1$ to $t_2$ and so on. Similarly, the output at terminal 93 is a signal $D_{21}$ resulting from the transmission of signal $f_1$ from antenna 11 during the time intervals $t_2$ to $t_3$ and so on, and the output at terminal 94 is a signal $D_{22}$ that results from transmission of signal $f_2$ from the same antenna during the time intervals $t_3$ to $t_4$ and so on.

The output terminals 91 and 92 are connected to pulse shaping circuits 101 and 102 respectively of the phase detector 28 (FIG. 4b) and the output terminals 93 and 94 are connected to pulse shaping circuits 103 and 104 respectively, of the phase detector 29. The pulse shapers 101 and 102 are respectively connected to differentiators 111 and 112 which are in turn coupled to the reset and set terminals respectively of a flip-flop 115. The $\overline{Q}$ and Q outputs of the flip-flop 115 are connected to one input of two-level AND gates 116 and 117, and thence to binary counters 118 and 119, respectively. Similarly, the outputs from the differentiators 113 and 114 are connected to the reset and set terminals of a flip-flop 120 respectively. The $\overline{Q}$ and Q outputs of the flip-flop 120 are connected to one input of two-level AND gates 121 and 122 respectively and thence to binary counters 123 and 124. The other inputs of the AND gates 116, 117, 121 and 122 are connected together to a clock pulse source 125 which provides clock pulses at intervals of one microsecond between successive pulses.

Figure 6:
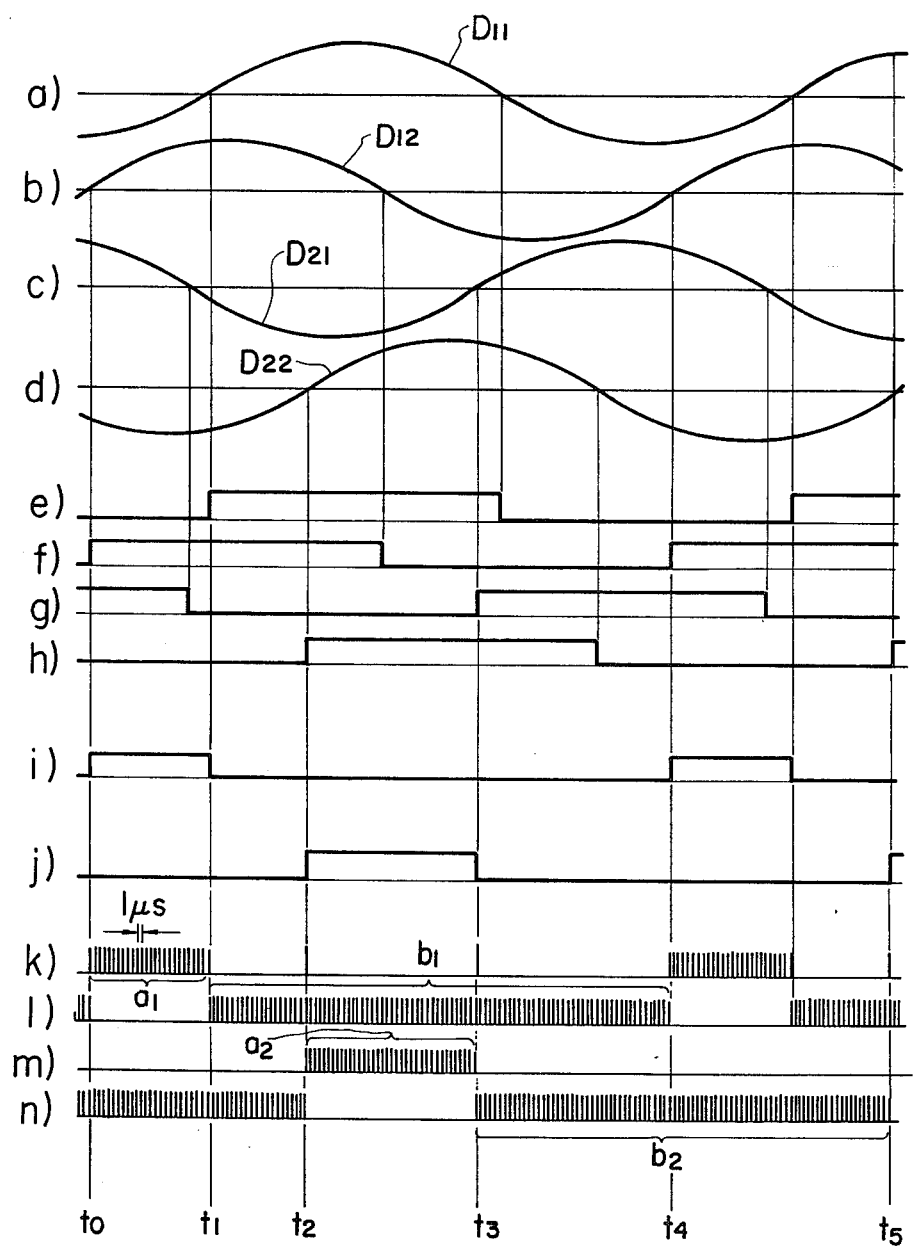

The operation of the phase detectors 28 and 29 will be understood by reference to the waveforms shown in FIG. 6. The sinusoidal waveforms shown in FIGS. 6a, 6b, 6c and 6d are Doppler signals $D_{11}$, $D_{12}$, $D_{21}$ and $D_{22}$, respectively. The pulse shapers 101 to 104 provides amplification of the input Doppler signals to generate rectangular pulses as respectively, shown in FIGS. 6e, 6f, 6g and 6h, so that the zero crossing point of each sinusoidal Doppler waveform corresponds to the leading or trailing edge of the shaped rectangular pulses. At time $t_o$, differentiator 112 provides an output which sets the flip-flop 115 resulting in the Q output going high which teriminates at time $t_1$ (FIG. 6i) when differentiator 111 produces its output. AND gate 117 is thus enabled during the time interval $t_0$ to $t_1$ and passes the clock pulses to the binary counter 119 which in turn produces a decimal count output $a_1$ at its output (FIG. 6k). During the time interval $t_1$ to $t_4$, the flip-flop 115 remains in its reset condition so that its Q output is at the high voltage level so that AND gate 116 is enabled to pass the clock pulses to the counter 118 which produces a decimal count output $b_1$ (FIG. 6*l*). The phase difference $\Delta\phi_1$ between the signals $D_{11}$ and $D_{12}$ is given by $2\pi a_1/(a_1 + b_1)$, and the outputs from the counters 118 and 119 are fed into the microcomputer 30 to perform the computation.

At time $t_2$ differentiator 114 produces an output which changes the flip-flop 120 to the set condition which is terminated by the output from differentiator 113 at time $t_3$ (FIG. 6*j*). AND gate 122 is thus enabled during the time interval $t_2$ to $t_3$ to pass the clock pulses to the counter 124 which produces a decimal output $a_2$ (FIG. 6*m*). During the time interval $t_3$ to $t_5$, the flip-flop 120 is in the reset condition which enables the AND gate 121 and the counter 123 produces a decimal count output $b_2$ (FIG. 6*n*). The signals representing the decimal counts $a_2$ and $b_2$ are fed into the microcomputer 30 to obtain the phase difference $\Delta\phi_2$ between signals $D_{21}$ and $D_{22}$ which is given by $2\pi a_2/(a_2 + b_2)$.

The microcomputer 30 is one of any conventional designs which are capable of handling arithmetic operations. The computer 30 is programmed to process the signals representing the decimal outputs $a_1$, $b_1$, $a_2$ and $b_2$ from the phase detectors 28 and 29 in accordance with a series of steps as shown in FIG. 8. In Step 1, the computer is programmed to obtain the phase difference $\Delta\phi_1$ between the Doppler signals $D_{11}$ and $D_{12}$ and in step 2 the phase difference $\Delta\phi_2$ between Doppler signals $D_{21}$ and $D_{22}$ is calculated. In step 3, the difference $\Delta\phi_R$ between the first and second phase differences $\Delta\phi_1$ and $\Delta\phi_2$ is calculated and compared with $\pi$ radian. The program will go to step $4_1$ or step $4_2$ depending on whether the phase difference $\Delta\phi_R$ is smaller or greater than $\pi$ radian. In step 5, the range difference $\Delta R$ is calculated in accordance with Equation 12 or 13 and in step 6, the azimuth angle $\theta$ is finally obtained using the result of step 5.

The microcomputer is further programmed to determine when the object ahead is in a dangerous zone of the vehicle. FIG. 8 illustrates a flow chart in which various data necessary for calculation are supplied. The data include vehicle speed Va, relative speed Vr to the object ahead, range R to the object and the azimuth angle $\theta$.

In step 1, Va and Vr are compared against each other and if the former is greater than the latter, the object is recognized as a moving object and the vehicle's stopping distance Ra is calculated in accordance with the formula in step 2. If the former is smaller than the latter, the program will poceed to step 3 to determine whether Va is substantially equal to Vr and if so, the object is recognized as stationary and the formula in step 4 will be calculated to determine its maximum stopping distance with respect to the stationary object.

A range signal R representing the distance to the object at a given instant of time is entered to the program for comparison with the calculated stopping distance Ra. Step 5 performs this comparison and if the signal R is greater than Ra the program proceed to step 6 to compare the azimuth angle $\theta$ obtained in a manner previously described with a reference signal representing l/R. If the azimuth angle is smaller than the reference, the program goes to step 7 to compute $d\theta/dR$. If this differentiated value is equal to or smaller than $1/R^2$ which is the differentiation of 1/R with R, the computer recognizes the situation as dangerous and issues a danger signal which is used to alert the driver or actuate the brakes. If any one of steps 5, 6 and 7 delivers no signal the program will be restarted to repeat the procedures again.

Figure 9:
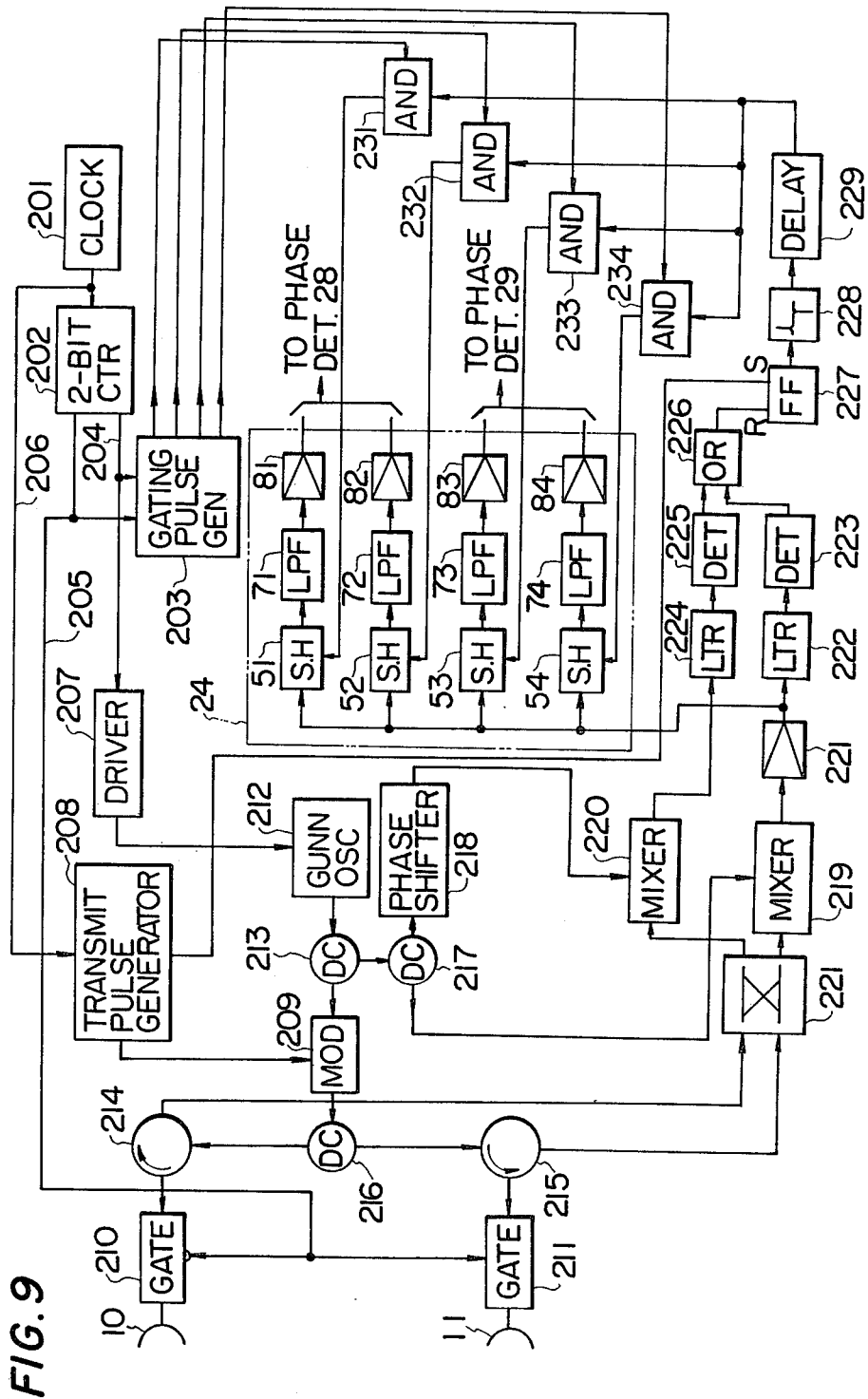
FIG. 9 is a second preferred embodiment of the invention.
Figure 10:
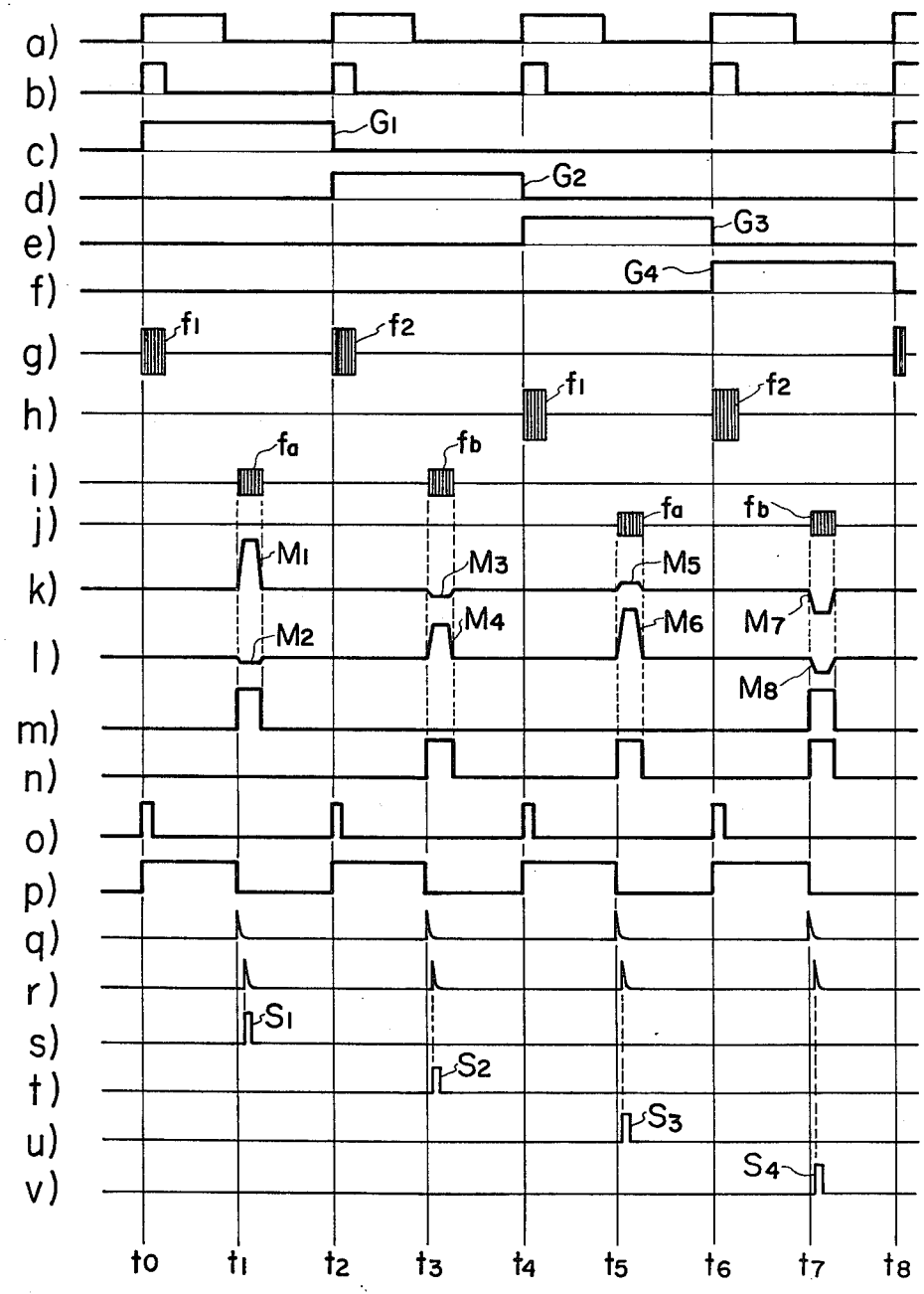
FIG. 10 is a waveform diagram useful for describing the operation of the embodiment of FIG. 9.

FIG. 9 illustrates a second preferred embodiment of the invention. In FIG. 9, a clock pulse generator 201 supplies clock pulses (FIG. 10*a*) to a 2-bit binary counter 202 which converts the input signal into a first train of pulses at one-half the input frequency and a second train of pulses at one-fourth the input frequency. Each pulses of the first pulse train has a duration which begins at time $t_0$ and ends at time $t_4$, while the pulse of second train has a duration twice as that of the first train pulse. The first train pulses are applied through lead 204 to an input of a gating pulse generator 203 and also to a pulse driver 207, and the second train pulses ar applied through lead 205 to the control terminals of transmission gates 210 and 211. The clock pulses are also supplied over lead 206 to a transmit pulse generator 208 which produces in response thereto short-duration pulses (FIG. 10*b*) which are applied to a modulator 209 to produce narrow pulses (FIG. 10*o*). The gating pulse generator 203 processes the input pulses to generate four trains of gating pulses which occur in sequence during time intervals $t_0$ to $t_2$, $t_2$ to $t_4$, to $t_4$ to $t_6$ and $t_6$ to $t_8$ (FIGS. 10*c* to 10*f*).

The pulse driver 207 provides amplification of the input pulses and drives a Gunn diode oscillator 212 so that the output from the oscillator 212 is at a frequency $f_1$ during the interval $t_0$ to $t_2$ and at a frequency $f_2$ during the subsequent interval $t_2$ to $t_4$. The oscillator output is passed through a directional coupler 213 to the pulse modulator 209 and gated therethrough in response to the control pulses (FIG. 10*b*) to circulators 214 and 215 via directional coupler 216. Transmission gate 210 is gated into conduction for an interval $t_0$ to $t_4$ while gate 211 is gated during the interval $t_4$ and $t_8$. The result is a transmission of a recurrent series of multiburst signals from the antenna 10 alternately with a recurrent series of similar multiburst signals transmitted from the antenna 11. Each multiburst signal represents separated bursts of energy at frequencies $f_1$ and $f_2$ (see FIGS. 10*g* and 10*h*). The oscillator output is divided by the directional coupler 213 to another directional coupler 217 which branches out the input signal to a phase shifter 218 on the one hand and to a mixer 219 as a local oscillation on the other hand. The phase shifter 218 imparts a 90° phase shift to the input signal and feeds the phase-shifted local oscillation to a second mixer 220. A directional coupler 221 is provided which couples the return signal from circulator 214 to the mixers 219 and 220 and also couples the return signal from circulator 215 to both mixers.

Since transmission gate 210 is gated on during the time interval $t_0$ to $t_4$, a return signal may be received at time $t_1$ and at time $t_3$ (FIG. 10*i*). The return signal at time $t_1$ has a frequency $fa$ ($=f_1 \pm f_{d1}$) and the mixers 219 and 220 provide synchronous detection of the received signal by mixing it with the local oscillations, resulting an output $M_1$ from the mixer 219 and an output $M_2$ from the mixer 220 (FIGS. 10*k* and 10*l*). The other return signal received at time $t_3$ has a frequency $fb$ ($=f_2 \pm f_{d2}$) and is detected in a similar manner so that outputs $M_3$ and $M_4$ are delivered from the mixers 219 and 220, respectively.

Druing the time interval $t_4$ to $t_8$, transmission gate 211 is gated into conduction to transmit signals from circulator 215 and receive the return signals at frequencies $fa$ and $fb$ at times $t_5$ and $t_7$, respectively. At time $t_5$, the received signal is detected by mixers 219 and 220 to produce outputs $M_5$ and $M_6$ from mixers 219 and 220, respectively, and at time $t_7$ mixers 219 and 220 produce their outputs $M_7$ and $M_8$, respectively.

Since there is a phase difference of 90° between the two local oscillations, there is a phase shift of 90° between the envelopes of the outputs from the mixers 219 and 220, and therefore there is always an output of appreciable amplitude at least one of the outputs from the mixers at any instant of signal reception. The mixer 219 output is amplified by an amplifier 221 and then applied on the one hand to Doppler detector 24 and on the other hand to a limiter 222 where the signal is greatly amplified to form rectangular pulses and fed into a level detector 223. The detector 223 compares the input signal with a predetermined threshold level and eliminates the signals of amplitude below the detecting level (FIG. 10m). The output from the mixer 220 is similarly processed through a limiter 224 and a level detector 225 to produce pulses as shown in FIG. 10n and applied to an OR gate 226 to which is also applied the signal from the detector 223. The output from the OR gate 226 is used to synthesize sampling pulses for the Doppler detector 24. A flip-flop 227 is provided having its set terminal connected to the transmit pulse generator 208 to receive its pulses (FIG. 10o) and its resetting terminal connected to the output of OR gate 226. This results in a train of pulses as shown in FIG. 11p from the flip-flop 227. A differentiator 228 is connected to the flip-flop 227 to differentiate the output therefrom to provide pulses in response to the trailing edges of the input pulses (FIG. 10q). The differentiator output occurs in step with the reception of the return signals and is delayed by a predetermined interval by a delay circuit 229 (FIG. 10r) and fed into AND gates 231, 232, 233 and 234. These AND gates are enabled by gating-on pulses $G_1$, $G_2$, $G_3$ and $G_4$ (FIGS. 10c to 10f), respectively to pass the delayed pulse to sample-and-hold circuits 51, 52, 53 and 54 in sequence. Therefore, sample-hold 51 is gated by a sampling pulse $S_1$ from AND gate 231 to sample the mixer 219 output $M_1$ at the midway of its duration. Similarly, sampling pulse $S_2$ from AND gate 232 is applied to the sample-hold 52 to sample the output $M_3$, and sampling pulses $S_3$ and $S_4$ are used to sample the mixer 219 outputs $M_5$ and $M_7$, respectively. In a similar manner to that described in connection with the previous embodiment, the sampled signals are held until the next sampling pulse and passed to the respective lowpass filters 71 to 74 and amplified by the respective amplifiers 81 to 84.

Since the flip-flop 227 changes to its stable state in response to the instant each burst energy of microwave frequency ($f_1$ or $f_2$) is transmitted and retains this stable state until the return signal is received, the sampling pulse is generated only in response to the return signal that is reflected from the object closest to the vehicle.

What is claimed is:

1. A method for determining the angular displacement of an object in front of a motor vehicle from the center axis of said vehicle, comprising the steps of:
    transmitting a first sequence of alternately occurring bursts of energy at first and second frequencies from a first antenna and a second sequence of alternately occurring bursts of energy at first and second frequencies from a second antenna at alternate intervals with the bursts of said first sequence, said first and second antennas being mounted equally spaced from said center axis of said vehicle;
    receiving the signals reflected from said object;
    deriving first and second Doppler signals from the received signals resulting from the reflection of the bursts transmitted from said first antenna and deriving third and fourth Doppler signals from the received signal resulting from the reflection of the bursts transmitted from said second antenna;
    generating a first signal representing the phase difference between said first and second Doppler signals and a second signal representing the phase difference between said third and fourth Doppler signals; and
    computing said angular displacement using said first and second phase difference representative signals.

2. A method as claimed in claim 1, wherein the step of transmission comprises generating a sequence of alternately occurring bursts of oscillation at first and second frequencies and alternately feeding said sequence of bursts to said first and second antennas.

3. A method as claimed in claim 2, wherein the step of derivation comprises providing the interaction between the generated oscillation and the received signals, sampling the signal resulting from said interaction at timed intervals for presentation to different paths, and shaping the sampled signals on the different paths into sinusoidal waveforms.

4. A method as claimed in claim 1, wherein said bursts at said first and second frequencies are transmitted consecutively, and said reflected signal is received while said bursts are transmitted.

5. A method as claimed in claim 1, wherein said bursts at said first and second frequencies are separately transmitted in sequence, and said reflected signal is received after each of said separate bursts is transmitted.

6. A method as claimed in claim 1, wherein the step of generating said first and second phase difference representative signals comprises:
    generating clock pulses;
    counting said clock pulses during the interval from the instant when said first Doppler signal crosses its zero voltage level in a specified direction to the instant when said second Doppler signal crosses its zero voltage level in the same direction to provide a first count;
    counting said clock pulses during the interval from the instant when said second Doppler signal crosses said zero voltage level to the instant when said first Doppler signal subsequently crosses its zero voltage level in the same direction as said specified direction to provide a second count;
    counting said clock pulses during the interval from the instant when said third Doppler signal crosses its zero voltage level in a specified direction to the instant when said fourth Doppler signal crosses its zero voltage level in the same direction to provide a third count; and
    counting said clock pulses during the interval from the instant when said fourth Doppler signal crosses said zero voltage level to the instant when said third Doppler signal subsequently crosses its zero voltage level in the same direction as said specified direction,
    representing said first phase difference signal by $2\pi a_1/(a_1 + b_1)$, where $a_1$ and $b_1$ represent said first and second counts, respectively; and
    representing said second phase difference signal by $2\pi a_2/(a_2 + b_2)$, where $a_2$ and $b_2$ represent said third and fourth counts, respectively.

7. A method as claimed in claim 6, wherein the step of computation comprises calculating the following formulae:

$$\frac{c|\Delta\phi_1 - \Delta\phi_2|}{8\pi l (f_1 - f_2)},$$

when $|\Delta\phi_1 - \Delta\phi_2|$ is smaller than $\pi$ radian, or $$\frac{c(2\pi - |\Delta\phi_1 - \Delta\phi_2|)}{8\pi l (f_1 - f_2)},$$

when $|\Delta\phi_1 - \Delta\phi_2|$ is greater than $\pi$ radian.
where, $\Delta\phi_1 = 2\pi a_1/(a_1 + b_1)$
$\Delta\phi_2 = 2\pi a_2/(a_2 + b_2)$
$c$ = velocity of wave propagation
$l$ = distance between the center axis of said vehicle and each of said first and second antennas
$f_1$ = said first frequency
$f_2$ = said second frequency 8. Apparatus for determining the angular displacement of an object in front of a roadway vehicle from the center axis of the vehicle, comprising:
first and second antennas mounted at the front end of said vehicle equally spaced from said center axis of said vehicle;
means for generating a sequence of alternately occurring bursts of oscillation at first and second frequencies;
means for alternately feeding said sequence of bursts to said first and second antennas such that a first sequence of alternately occurring bursts of oscillation at said frequencies is transmitted from said first antenna and a second sequence of alternately occurring bursts of oscillation at said frequencies is transmitted from said second antenna at alternate intervals with the bursts of said first sequence;
a mixer for providing the interaction between local oscillation from said generating means and return signals received at said first and second antennas as a result of said transmitted bursts being reflected from said object;
means for deriving from the output from said mixer first and second Doppler signals respectively representative of Doppler shifts resulting respectively from the reflection of the bursts at said first and second frequencies transmitted from said first antenna, and third and fourth Doppler signals respectively representative of Doppler shifts resulting repsectively from the reflection of the bursts at said first and second frequencies transmitted from said second antenna;
means for generating a first signal representative of the difference in phase between said first and second Doppler signals;
means for generating a second signal representative of the difference in phase between said third and fourth Doppler signals; and
computing means programmed to process said first and second phase difference representative signals to obtain said angular displacement.

9. Apparatus as claimed in claim 8, comprising timing pulse generating means for providing first timing pulses and second timing pulses with a duration twice that of said first timing pulses, and wherein said burst oscillation generating means includes a voltage-controlled semiconductor microwave oscillator responsive to the voltage level of said first timing pulses, and said feeding means includes first and second gate-controlled switching devices alternately responsive to the different voltage levels of said second timing pulses for coupling the output from said microwave oscillator to said first and second antennas, respectively.

10. Apparatus as claimed in claim 9, wherein said Doppler signal deriving means comprising means for generating a set of first, second, third and fourth trains of successively occuring sampling pulses in response to the transmission of each burst from said antennas, a set of first, second, third and fourth sample-and-hold circuits for sampling the output of said mixer in response to said first, second, third and fourth sampling pulses, respectively, and lowpass filter means connected to each of said sample-and-hold circuits for generating a sinusoidal waveform to represent each of said Doppler signals.

11. Apparatus as claimed in claim 9, further comprising means for generating third timing pulses at a frequency twice that of said first timing pulses with a duration smaller than that of said first timing pulses, and a pulse modulator for modulating the output from said microwave oscillator in response to said third timing pulses, whereby the signal transmitted from said first antenna is a first sequence of multiburst signals and the singal transmitted from said second antenna is a second sequence of multiburst signals occurring alternately with the multibrust signals of the first sequence, each of said multiburst signals representing two separate bursts of energy at said first and second frequencies.

12. Apparatus as claimed in claim 11, wherein said Doppler signal deriving means comprises means for generating fourth timing pulses in response to the return signals received at said first and second antennas, a bistable device responsive to the leading edge of the third timing pulses to assume a first stable state and responsive to the leading edge of said fourth timing pulses to assume a second stable state, means for generating fifth timing pulses each occuring at a delayed point in time from the instant said bistable device assumes said second stable state so that each of the delayed pulses occurs at substantially at the midway of the duration of each output from said first mixer, a set of first, second, third and fourth sample-and-hold circuits successively responsive to said delayed pulses for sampling the output from said first mixer, and lowpass filter means connected to each of said sample-and-hold circuits for shaping the output therefrom into a sinusoidal waveform to represent each of said Doppler signals.

13. Apparatus as claimed in claim 12, wherein said fourth timing pulse generating means comprises a phase shifter for shifting the phase of local oscillation from said microwave oscillator by a predetermined amount, a second mixer for providing the interaction between the phase-shifted local oscillation and the return signals received at said first and second antennas, and first and second limiters for providing amplification of the outputs from said first and second mixers respectively so that the amplified output is at one of two discrete levels, the output from said limiters being applied to one input of said bistable device.

14. Apparatus as claimed in claim 8, wherein said means for generating first phase difference representative signal comprises a set of first and second means for shaping the first and second Doppler signals into a first and second rectangular pulses, a set of first and second differentiators for differentiating the output from said first and second shaping means respectively, a bistable device responsive to the output from said first differentiator to assume a first stable and responsive to the output from said second differentiator to assume a second stable state, a set of first and second gate circuits respectively responsive to said bistable device being in said first and second stable states, a clock pulse generating source for supplying clock pulses to said gate circuits, a set of first and second counters for counting said clock pulses when said gate circuits are enabled in response to the stable states of said bistable device to provide first and second count outputs respectively, and means for calculating $2\pi a_1/(a_1 + b_1)$, where $a_1$ and $b_1$ represent said first and second count outputs respectively, and wherein said means for generating second phase difference representative signal comprises a set of first and second means for shaping the third and fourth Doppler signals into a third and fourth rectangular pulses, a set of third and fourth differentiators for differentiating the output from said third and fourth shaping means respectively, a second bistable device responsive to the output from said third differentiator to assume a first stable state and responsive to the output from said fourth differentiator to assume a second stable state, a set of third and fourth gate circuits respectively responsive to said bistable device being in said first and second stable state for passing said clock pulses to their respective outputs, a set of third and fourth counters for counting siad clock pulses passed through said third and fourth gate circuits to provide third and fourth count outputs respectively, and means for calculating $2\pi a_2/(a_2 + b_2)$, where $a_2$ and $b_2$ represent said third and fourth count outputs respectively.

* * * * *